US012161897B2

(12) United States Patent
Di Losa

(10) Patent No.: US 12,161,897 B2
(45) Date of Patent: Dec. 10, 2024

(54) HEIGHT SAFETY DAVIT WITH FAIL-SAFE MECHANISM

(71) Applicant: Beaver Technology Services Pty Limited, Girraween (AU)

(72) Inventor: Christopher Di Losa, Girraween (AU)

(73) Assignee: Beaver Technology Services Pty Limited, Girraween (AU)

( * ) Notice: Subject to any disclaimer, the term of this patent is extended or adjusted under 35 U.S.C. 154(b) by 0 days.

(21) Appl. No.: 18/571,689

(22) PCT Filed: Mar. 16, 2023

(86) PCT No.: PCT/AU2023/050189
§ 371 (c)(1),
(2) Date: Dec. 18, 2023

(87) PCT Pub. No.: WO2023/173175
PCT Pub. Date: Sep. 21, 2023

(65) Prior Publication Data
US 2024/0261604 A1 Aug. 8, 2024

(30) Foreign Application Priority Data
Mar. 16, 2022 (AU) ................................ 2022900639

(51) Int. Cl.
*A62B 35/04* (2006.01)
*A62B 35/00* (2006.01)
(Continued)

(52) U.S. Cl.
CPC .......... *A62B 35/04* (2013.01); *A62B 35/0068* (2013.01); *B66C 23/90* (2013.01); *A62B 35/0093* (2013.01); *B66C 23/166* (2013.01)

(58) Field of Classification Search
CPC . A62B 35/04; A62B 35/0068; A62B 35/0093; B66C 23/90; B66C 23/166
See application file for complete search history.

(56) References Cited

U.S. PATENT DOCUMENTS 2,023,258 A * 12/1935 Young ..................... B63B 23/06 114/373
3,671,986 A * 6/1972 Peters ..................... B63B 23/10 114/373
(Continued)

FOREIGN PATENT DOCUMENTS

GB 2515341 B 7/2017
IT MI20102117 A1 9/2013

OTHER PUBLICATIONS

International Search Report and Written Opinion received for PCT Application No. PCT/AU2023/050189, mailed on Apr. 17, 2023, 8 pages.

*Primary Examiner* — Anita M King
(74) *Attorney, Agent, or Firm* — AEON Law, PLLC; Adam L. K. Philipp; Charlotte E Holoubek

(57) ABSTRACT

A davit (10) for arresting the fall of a person working at heights or for material handling where lifting of overloaded material is prevented, has a mast (12), a fuse holder (14) at the top of mast, a fuse head (16) connected to the fuse holder and having sacrificial fuses (18) arranged in series thereon, a jib arm (20) connected to the fuse head, and a primary fall arrestor system (22) having an arresting load limit and mounted to a side of the mast if the davit is to be used for arresting the fall of a person (25) working at heights, and/or a primary lifting-overload prevention system having a working load limit and safety factors if the davit is to be used for material handling where lifting of overloaded material (78) is to be prevented. When excessive forces are being absorbed either by the primary fall arrestor system or by the primary lifting-overload prevention system, the fuse head rotates downwardly relative to the fuse holder, and causes the breaking of one or progressively more of the sacrificial fuses until enough fuses have been broken to absorb the excessive forces.

16 Claims, 13 Drawing Sheets

(51) Int. Cl.
*B66C 23/16* (2006.01)
*B66C 23/90* (2006.01)

(56) References Cited

U.S. PATENT DOCUMENTS

| | | | | |
|---|---|---|---|---|
| 5,445,487 | A * | 8/1995 | Koscinski, Jr. | B66C 23/166 212/232 |
| 6,488,434 | B1 | 12/2002 | Graeff | |
| 7,370,769 | B2 * | 5/2008 | Picard | B66C 23/202 212/292 |
| 9,630,816 | B1 * | 4/2017 | Napieralski | B66C 19/02 |
| 10,287,138 | B2 * | 5/2019 | Italiano | B66C 23/06 |
| 10,315,892 | B2 * | 6/2019 | Almeda | B66C 23/166 |
| 10,865,076 | B1 * | 12/2020 | Schrank | B66C 23/166 |
| 11,993,946 | B2 * | 5/2024 | Miller | E04C 3/02 |
| 2003/0116518 | A1 * | 6/2003 | Austin | B66C 23/44 212/180 |
| 2005/0169735 | A1 * | 8/2005 | Pelsue | A62B 35/0068 414/469 |
| 2005/0284694 | A1 | 12/2005 | Faye et al. | |
| 2009/0127424 | A1 * | 5/2009 | Ly | E04G 23/002 248/544 |
| 2021/0102390 | A1 * | 4/2021 | McDermott | E04G 3/32 |
| 2023/0264930 | A1 * | 8/2023 | Kundel, Sr. | F16C 19/182 384/512 |

* cited by examiner

HEIGHT SAFETY DAVIT WITH FAIL-SAFE MECHANISM

RELATED APPLICATIONS

This application is a national entry of PCT International Patent Application No. PCT/AU2023/050189 for "HEIGHT SAFETY DAVIT WITH FAIL-SAFE MECHANISM," naming Christopher DI LOSA as first inventor, filed Mar. 16, 2023 in the name of "Beaver Technology Services Pty Limited", which PCT application claims the benefit of priority of Australia Patent Application Serial No. 2022900639, filed Mar. 16, 2022 in the name of "Beaver Technology Services Pty Limited". The entire contents of the above-referenced applications and of all priority documents referenced in the Application Data Sheet filed herewith are hereby incorporated by reference for all purposes.

TECHNICAL FIELD

The present invention relates to davits used for arresting the fall of a person working at heights or for material handling where lifting of material is required.

In particular, the invention relates to a height safety davit having sacrificial components for absorbing either excessive arresting forces experienced by a person when they are being arrested in their fall after falling from a height should a primary fall arrestor system having an arresting load limit of the davit be exceeded or malfunction, or excessive overloading forces experienced by the davit and which are exerted by a material to be lifted from a supporting surface, should a primary lifting-overload prevention system having a working load limit and safety factors of the davit be exceeded or malfunction.

In this specification, the words "excessive arresting forces" are to be understood to mean the forces greater than what a primary fall arrestor system having an arresting load limit of the davit can absorb, either when that arresting load limit is operational or malfunctioning.

In this specification, the words "excessive overloading forces" are to be understood to mean the forces greater than what a primary lifting-overload prevention system having a working load limit and safety factors of the davit can absorb, either when those working load limits and safety factors are operational or malfunctioning.

In this specification, the words "excessive forces" will be used to refer collectively to both the excessive arresting forces and the excessive overloading forces, and the words "non-excessive forces" will be used to refer collectively to both the forces substantially to, or below, what the primary fall arrestor system can absorb, and the forces substantially equal to, or below, what the primary lifting-overload prevention system can absorb.

BACKGROUND ART

The invention, and its background, will be described hereinafter predominantly in relation to its use as a height safety apparatus for persons working at heights, although it is to be understood that the description of the invention applies equally to its use in material handling.

Many different types of fall arrest systems for persons working at heights are known, such as roof surface mounted height safety anchors for persons working on roofs or elevated platforms, and vertical or horizontal lifeline systems for persons working from ladders, roofs or other elevated vertical or horizontal workspaces. Some of these systems are designed to absorb the energy of a falling person so that, not only is the fall arrested, but the person does not experience the sudden jolt or shock of an abrupt stop in the fall, which may cause injury to the person and damage to the fall arrest system. These shock absorbing fall arrest systems may involve sacrificial components configured to progressively distort or break under sudden overloading, or they may involve inertia reels or shock absorbing lanyards, thereby dampening the fall arrest forces on the person just prior to stopping the fall.

It is a motivation of the present inventor, and an object of this invention, to provide a davit which can be used either for arresting the fall of a person working at heights or for material handling where lifting of material is required.

It is another object of this invention to provide a fall arresting davit which uses sacrificial components as a fail-safe mechanism to absorb excessive arresting forces experienced by a person when they are being arrested in their fall after falling from a height, and so prevent or minimize injury to the person and possible damage to the davit.

It is still another object of this invention to provide a lifting-overload preventing davit which uses sacrificial components as a fail-safe mechanism to absorb excessive overloading forces experienced by the davit and which are exerted by a material to be lifted from a supporting surface, and so prevent overloading of, and possible damage to, the davit.

It is yet another object of this invention to provide a davit which immediately and clearly indicates to an operator that a major fall or material overload has occurred in which excessive forces have been experienced, so that removal of the davit from service and subsequent inspection and repair may take place.

It is a preferred object of this invention that, in the event of a major fall or material overload, it will be the sacrificial component of the davit that will only need to be replaced before the davit is returned to service.

It is another preferred object of this invention to provide a fall arresting davit which can absorb an arresting force of up to 22.2 kN in anchor point strength.

DISCLOSURE OF INVENTION

According to the present invention, there is provided a davit for arresting the fall of a person working at heights or for material handling where lifting of overloaded material is prevented; and for absorbing excessive forces experienced either by the person when they are being arrested in their fall after falling from a height, or by the davit and which are exerted by the material to be lifted from a supporting surface, the davit comprising:

(a) a mast secured at a lower end to a load bearing surface,
(b) a fuse holder secured to an upper end of the mast,
(c) a fuse head connected to the fuse holder by spaced apart first and second connections, the fuse head comprising a plurality of sacrificial fuses arranged in series thereon,
(d) a jib arm connected to the fuse head, and
(e) a primary fall arrestor system having an arresting load limit and mounted to a side of the mast if the davit is to be used for arresting the fall of a person working at heights, and/or a primary lifting-overload prevention system having a working load limit and safety factors if the davit is to be used for material handling where lifting of overloaded material is to be prevented, and wherein, when non-excessive forces are being absorbed either by the primary fall arrestor system or by the primary lifting-overload prevention system, the fuse head will remain stationary relative to the fuse holder, and wherein, when excessive forces are being absorbed either by the primary fall arrestor system or by the primary lifting-overload prevention system, the fuse head will rotate downwardly relative to the fuse holder, and wherein the rotation of the fuse head is around the first connection to the fuse holder and is the result of the excessive forces causing the second connection to the fuse holder to break one or progressively more of the sacrificial fuses of the fuse head until enough fuses have been broken to absorb the excessive forces experienced by the person when they are arrested in their fall or by the davit and which are exerted by the overloaded material to be lifted.

Preferably, the second connection is through a starter hole in the fuse head, the starter hole having an edge region which forms a first edge of a first sacrificial fuse in the series of sacrificial fuses.

It is preferred that the sacrificial fuses are a series of thin plate regions of the fuse head, arranged in an alternating order with a complementary series of holes, beginning with the starter hole, and located adjacent a circumferential edge of a circular crescent region of the fuse head.

In a preferred form, the primary fall arrestor system is a self-retracting lifeline.

In another preferred form, the davit comprises both a self-retracting lifeline and a material handling winch, and the material handling winch may be mounted on an opposite side of the mast to where the self-retracting lifeline is mounted.

There has been thus outlined, rather broadly, the more important features of the invention in order that the detailed description thereof that follows may be better understood and put into practical effect, and in order that the present contribution to the art may be better appreciated.

There are additional features of the invention that will be described hereinafter. As such, those skilled in the art will appreciate that the conception, upon which the disclosure is based, may be readily utilized as the basis for designing other structures, assemblies, process steps and system configurations for carrying out the object of the present invention. It is important, therefore, that the broad outline of the invention described above be regarded as including such equivalent features insofar as they do not depart from the spirit and scope of the present invention.

DETAILED DESCRIPTION OF THE INVENTION

Figure 1:
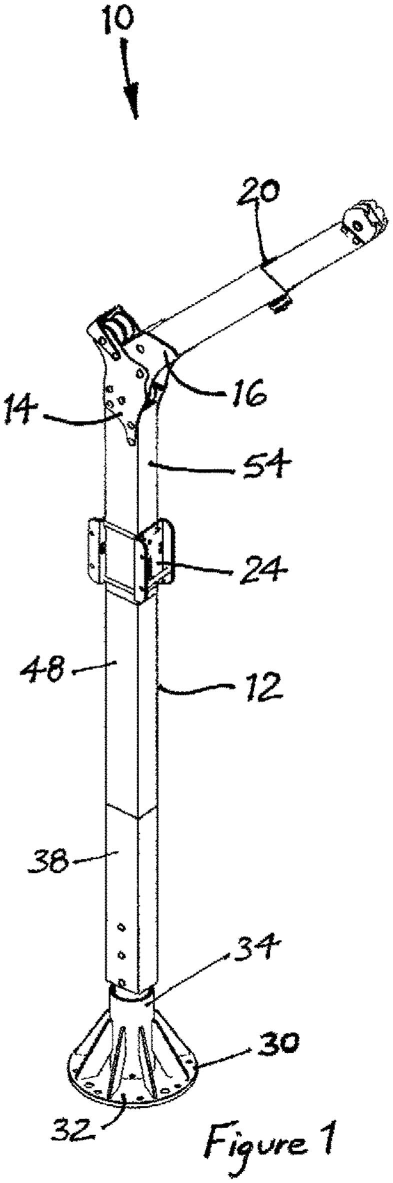
FIG. 1 is a top perspective view of a davit according to a preferred embodiment of the invention.

The davit 10 shown in FIGS. 1 and 2 (when suitably fitted with a primary fall arrestor system, to be described later) and in FIGS. 17 to 22 is used, for example, for arresting the fall of a person 25 working at heights, and for absorbing any excessive arresting forces experienced by the person during the fall. The davit 10 is able to absorb an arresting force of up to 22.2 kN in anchor point strength, which is well in advance of any similar known systems, while being lightweight, robust and portable. By absorbing any excessive arresting forces beyond the capacity of similar known systems, this "excessive force absorption" function of the davit 10 is able to arrest the fall of a person 25 without causing injury from any sudden jolt or shock caused by an abrupt stop in the fall, and damage to the davit 10 is prevented. The davit 10 can therefore provide a secondary "fail-safe" mechanism and improved height safety capability in addition to its primary function as a fall arrest system.

The davit 100 shown in FIG. 23, and the davit 110 shown in FIGS. 24 to 27 (when suitably fitted with a primary fall arrestor system, to be described later), can similarly be used for arresting the fall of a person 25 working at heights.

Moreover, the davit 110 and the davits 10, 100 (when suitably fitted with a primary lifting-overload prevention system, to be described later), can also be used for material handling where lifting of overloaded material 78 is to be prevented.

Figure 2:
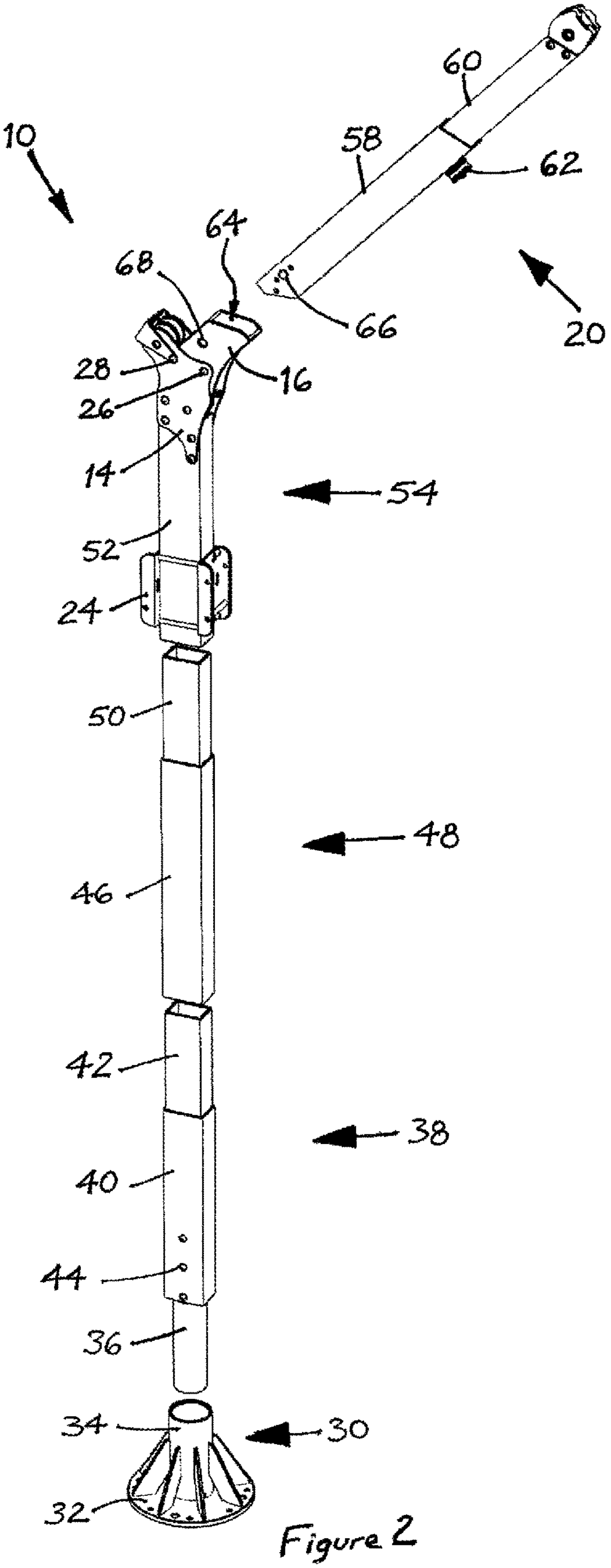
FIG. 2 is a partly exploded perspective view of the davit of FIG. 1.
Figure 3:
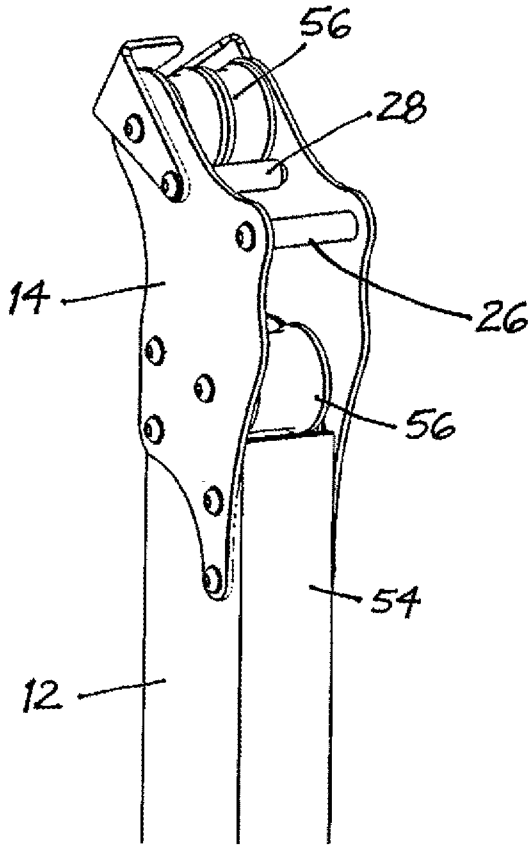
FIG. 3 is a perspective view of a fuse holder secured to an upper end of a mast of the davit of FIG. 1.
Figure 4:
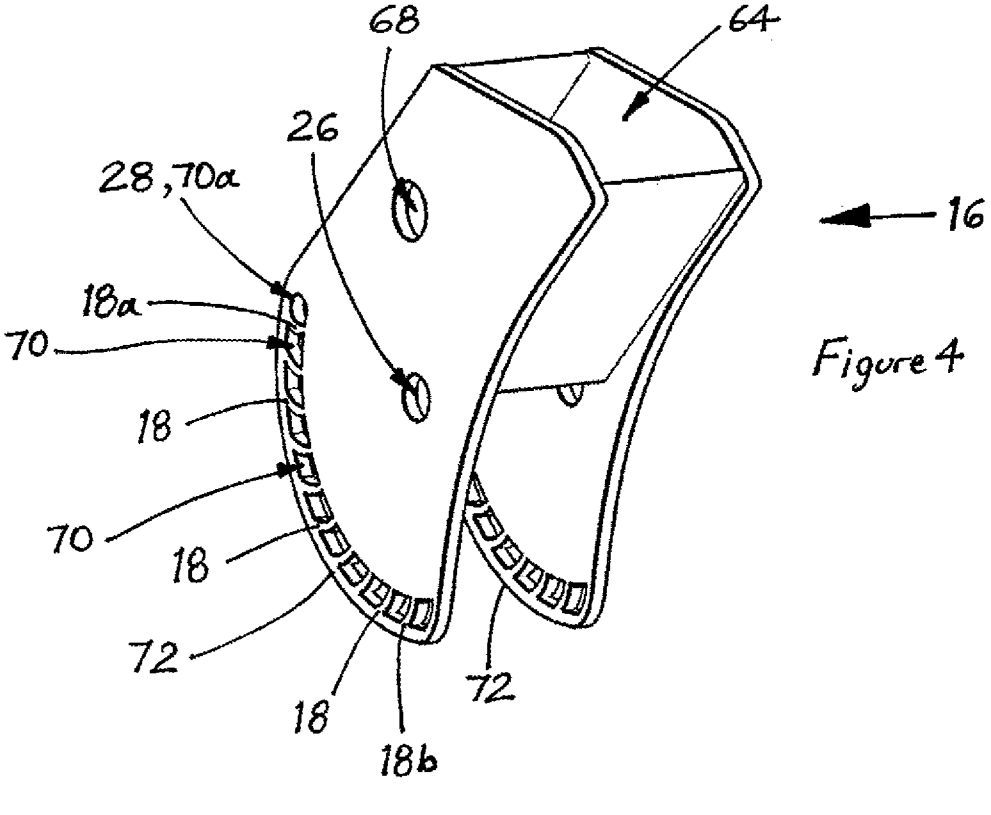
FIG. 4 is a slightly enlarged perspective view of a fuse head of the davit of FIG. 1.
Figure 6:
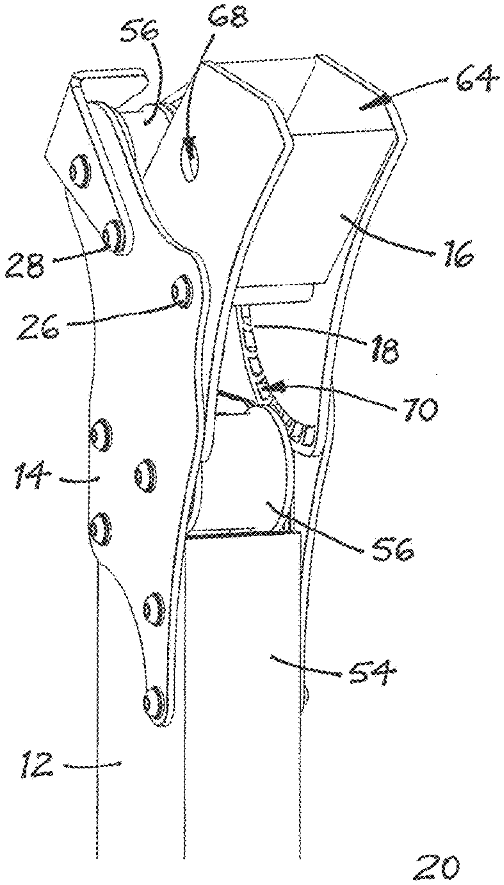
FIG. 6 is a perspective view of the fuse head of FIG. 4 connected to the fuse holder and mast of FIG. 3.
Figure 7:
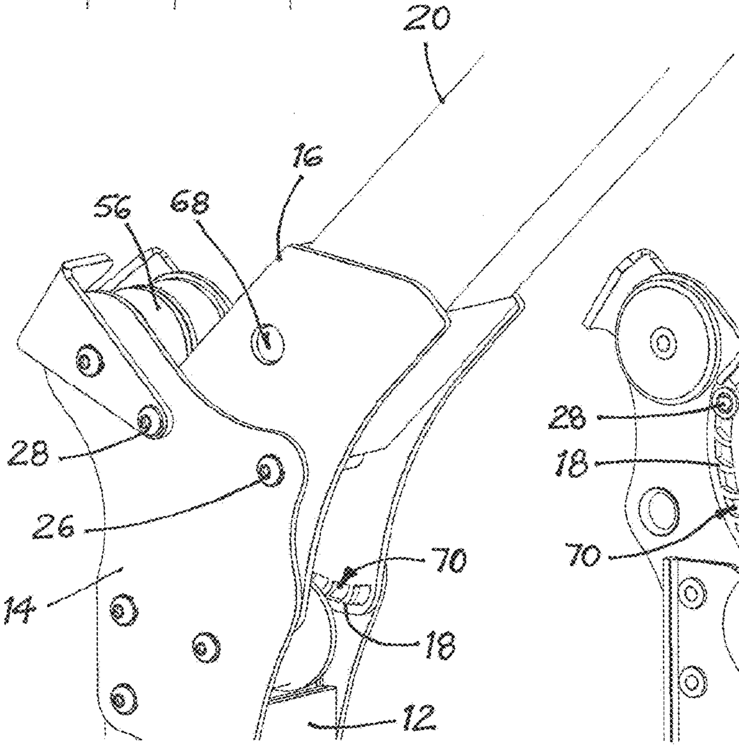
FIG. 7 is a perspective view of the lower end of a jib arm connected to the fuse head, fuse holder and mast of FIG. 6.
Figure 8:
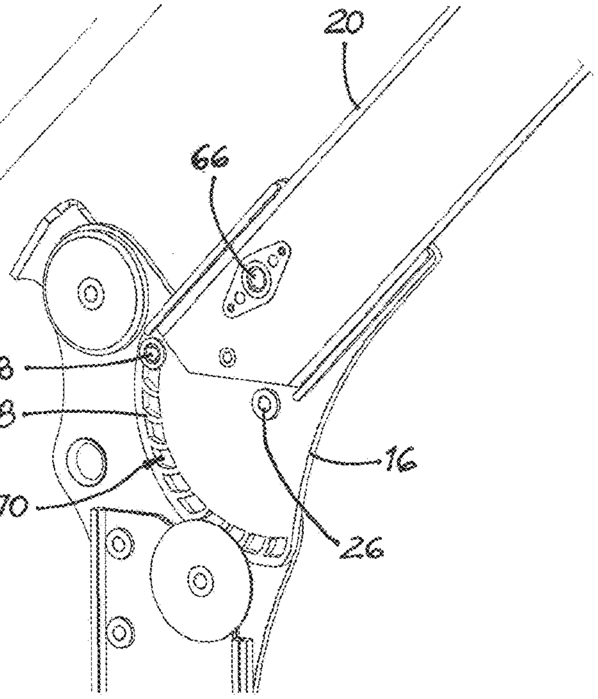
FIG. 8 is a sectional perspective view of the arrangement shown in FIG. 7.
Figure 9:
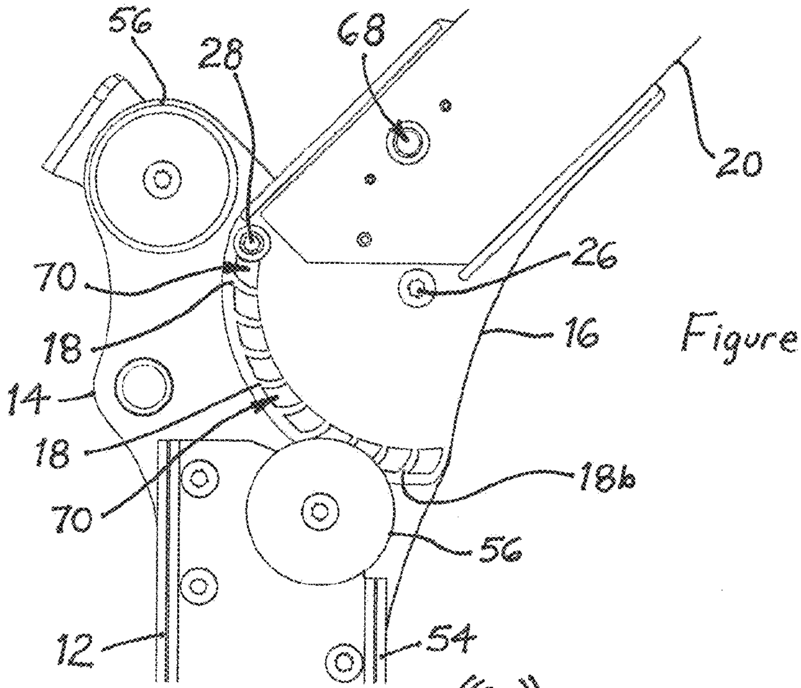
FIG. 9 is a partly sectional side view of the fuse head, fuse holder and mast of FIG. 6, but showing the jib arm unsectioned.

As shown in FIGS. 1 and 2, the davit 10 (in its broadest form) has a mast 12 secured at a lower end thereof to a load bearing surface, and the mast 12 has a fuse holder 14 secured to an upper end thereof (see especially FIG. 3). A fuse head 16, as shown in FIG. 4, is connected to the fuse holder 14 (see especially FIGS. 5 and 6). The fuse head 16 has a plurality of sacrificial fuses 18 arranged in series thereon (see especially FIG. 4). There is a jib arm 20 connected to the fuse head 16 (see especially FIG. 7).

Figure 17:
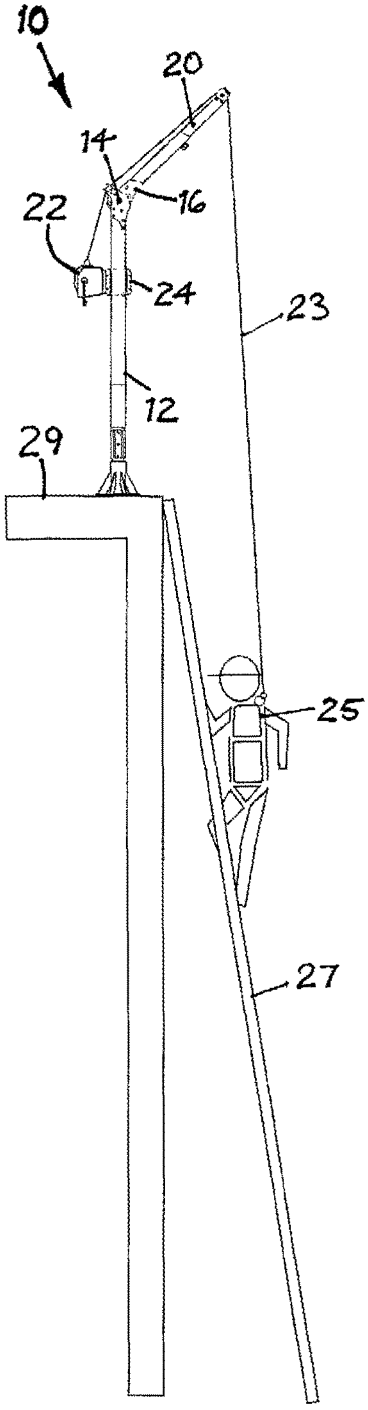
FIGS. 17 to 19 are schematic drawings of a person using the davit of FIG. 1, which now shows a self-retracting lifeline mounted to the mast of the davit, when climbing a ladder (see FIG. 17), when falling therefrom (see FIG. 18), and when arrested in their fall (see FIG. 19), but without the falling person experiencing excessive arresting forces, in which event the jib arm and fuse head have remained stationary relative to the fuse holder and mast of the davit.
Figure 18:
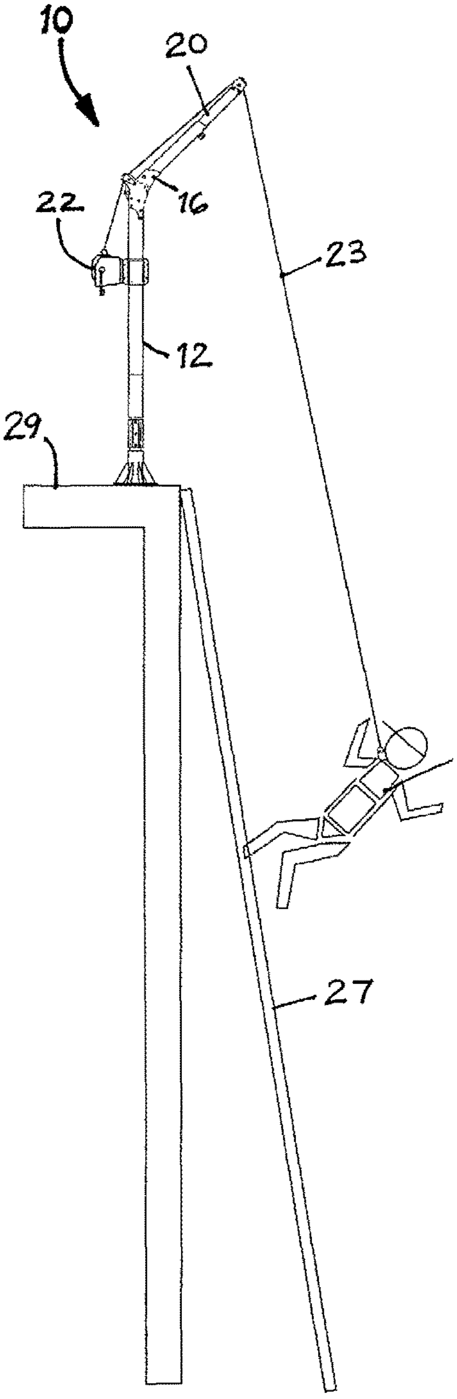
Figure 19:
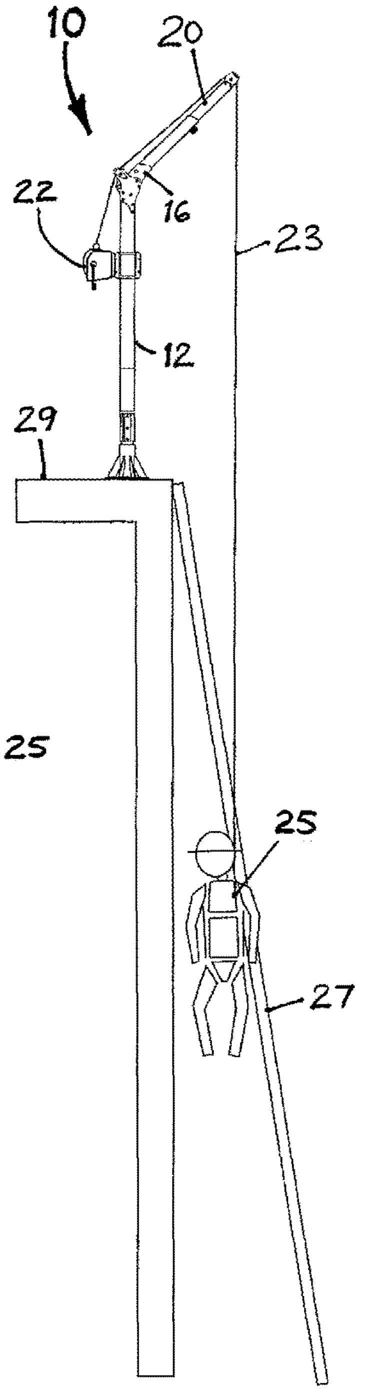
Figure 22:
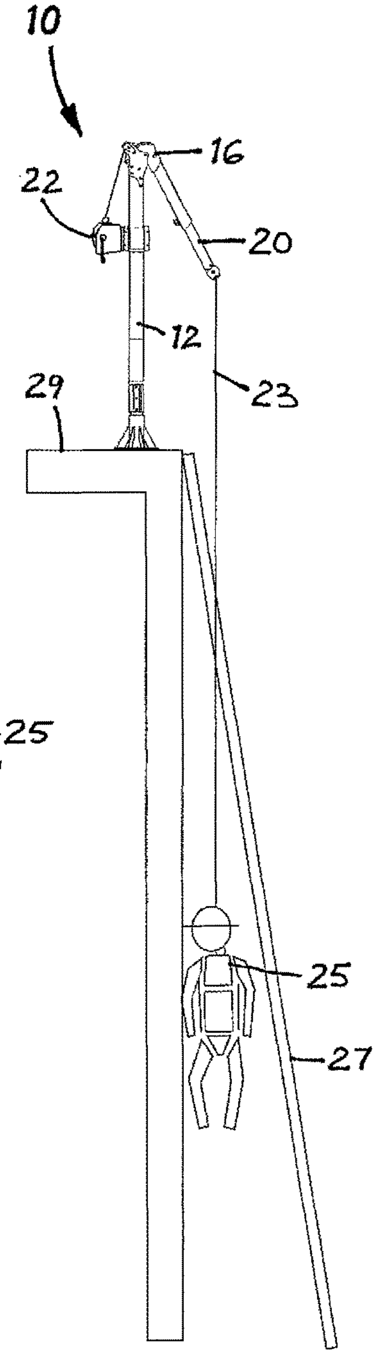
Figure 23:
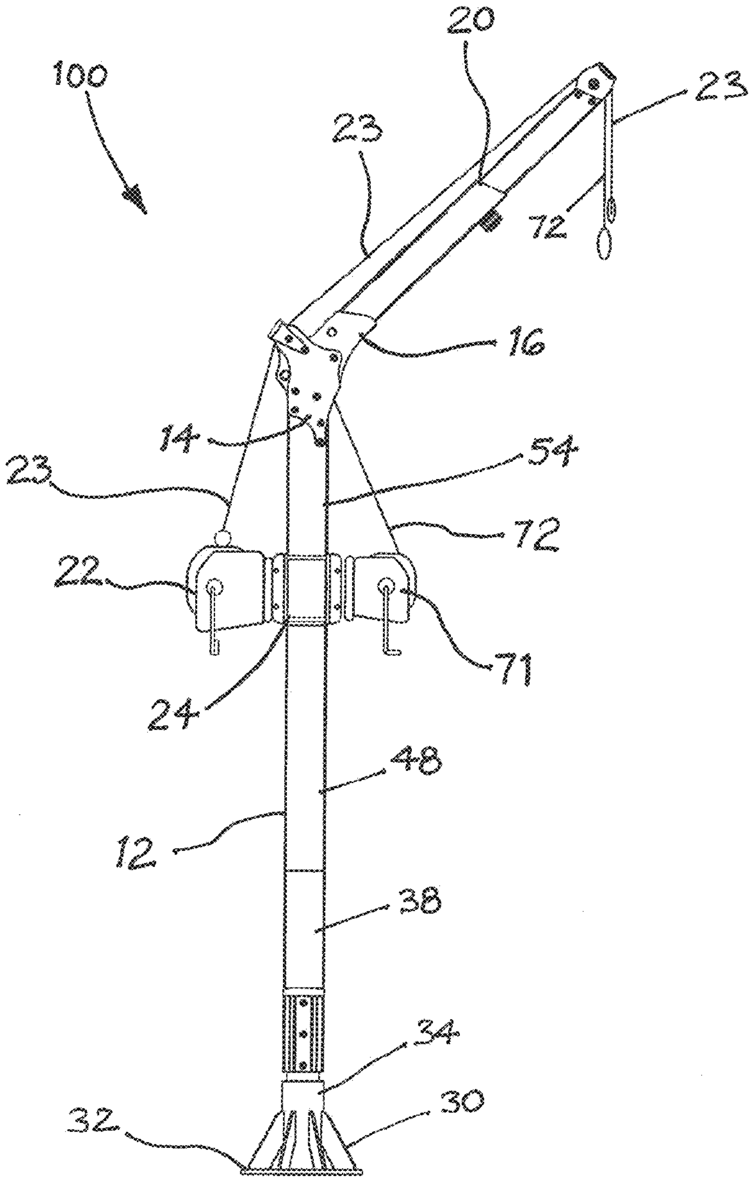
FIG. 23 is a side view of a davit according to another preferred embodiment of the invention, in which both a self-retracting lifeline and a material handling winch are mounted to the mast of the davit.
Figure 24:
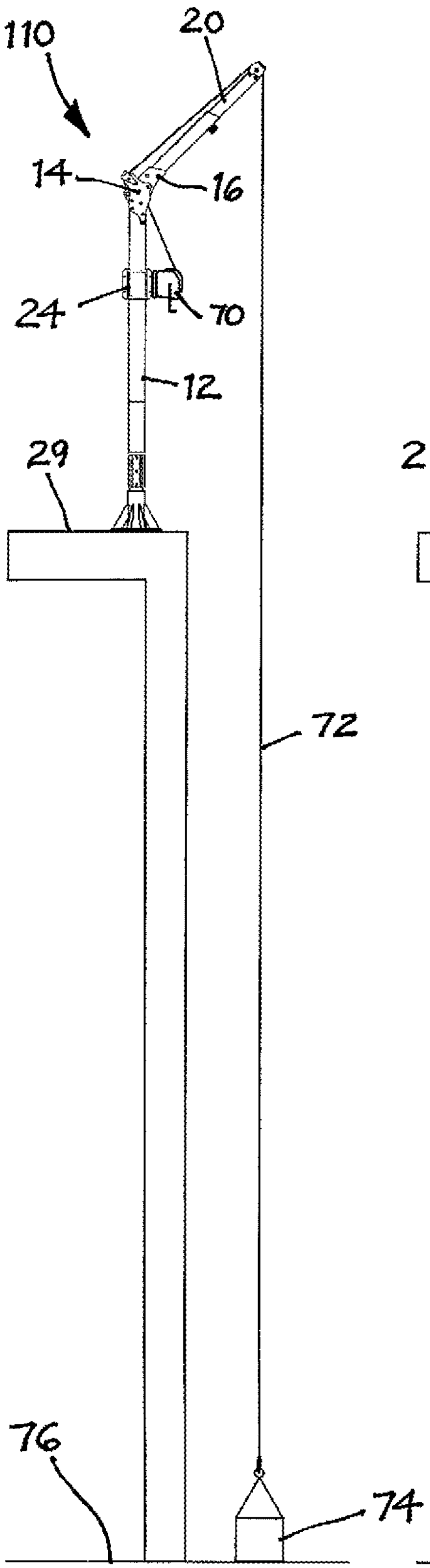
FIGS. 24 and 25 are schematic drawings of the use of a davit according to another preferred embodiment of the invention, in which only a material handling winch is mounted to the mast of the davit, and showing material to be lifted from a supporting surface (see FIG. 24) being lifted to an elevated position (see FIG. 25), without the davit experiencing excessive overloading forces, in which event the jib arm and fuse head have remained stationary relative to the fuse holder and mast of the davit.
Figure 25:
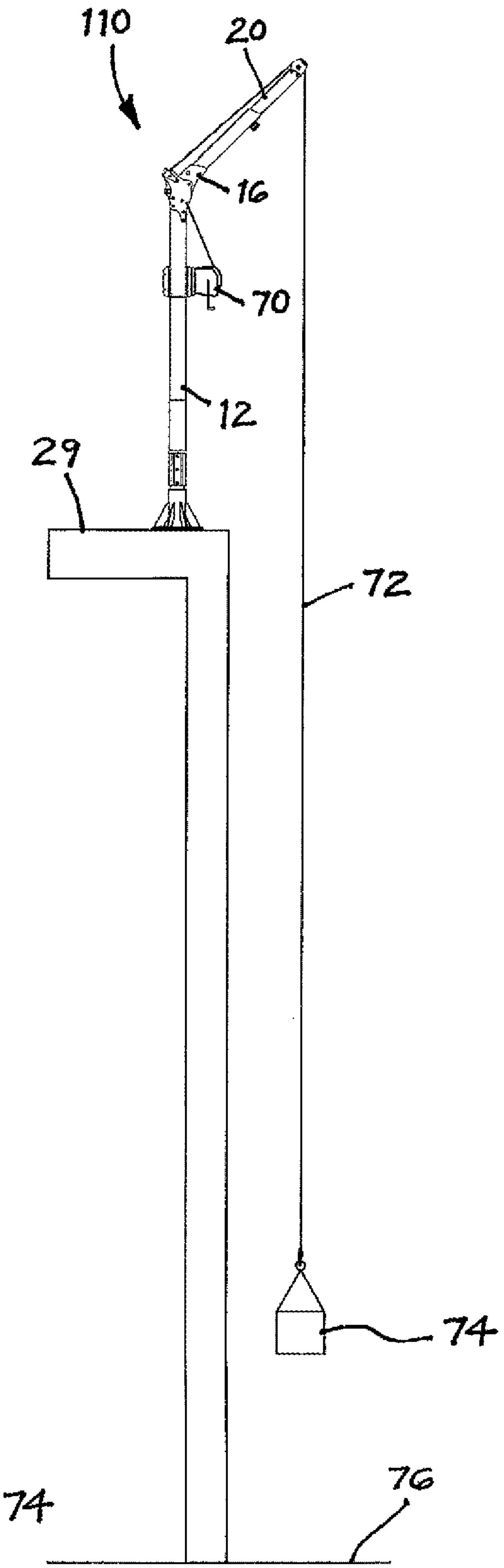
Figure 26:
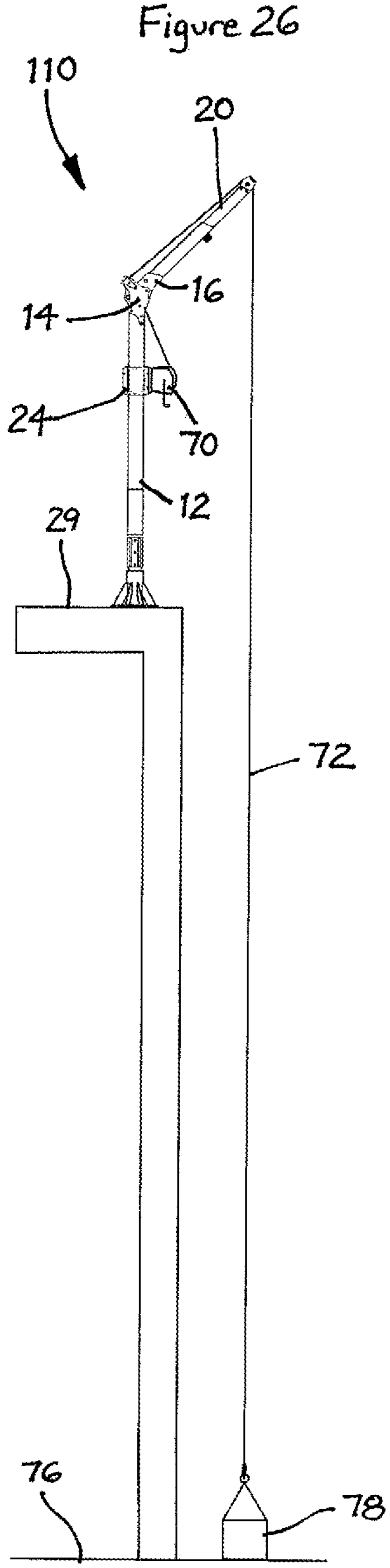
FIGS. 26 and 27 are similar successive schematic drawings to those of FIGS. 24 and 25, but showing overloaded material being prevented from being lifted, with excessive overloading forces being absorbed by the fuse head and causing the jib arm and fuse head to rotate downwardly relative to the fuse holder and mast of the davit.

A primary fall arrestor system, such as the self-retracting lifeline 22 used in the davit 10 shown in FIGS. 17 to 22 and in the davit 100 shown in FIG. 23, is mounted to the mast 12, preferably below the fuse holder 14, such as by mounting the self-retracting lifeline 22 (with its associated cable 23) to a first side of a double sided bracket 24. The self-retracting lifeline ("SRL") 22 is configured for attaching its SRL cable 23 to a person 25 working at heights, such as via known Type 2 or Type 3 SRLs rated to a maximum arrest force (or arresting load limit) of 6 kN during a fall. As a result, in a fall where the person 25 experiences non-excessive arresting forces (as shown in FIGS. 17 to 19), the person's fall from a ladder 27 is arrested by the self-retracting lifeline 22 mounted to the davit 10, 100.

The davit 100 shown in FIG. 23 also has a material handling winch 71 mounted to a second side of the bracket 24. The winch 71 is configured for attaching its winch cable 72 to a material 74 (or load), so that the material 74 can be lifted from a support surface 76 (see FIGS. 24 and 25).

The fuse head 16 is connected by spaced apart, first and second connections 26, 28 (see especially FIGS. 5 to 10) to the fuse holder 14. The arrangement of the first and second connections 26, 28 is such that the fuse head 16 will remain stationary relative to the fuse holder 14 when the self-retracting lifeline 22 is in operation to arrest the fall of a person who experiences non-excessive arresting forces during the fall. As shown in FIG. 19, such a fall does not cause the fuse head 16 and jib arm 20 to rotate downwardly relative to the fuse holder 14.

Figure 20:
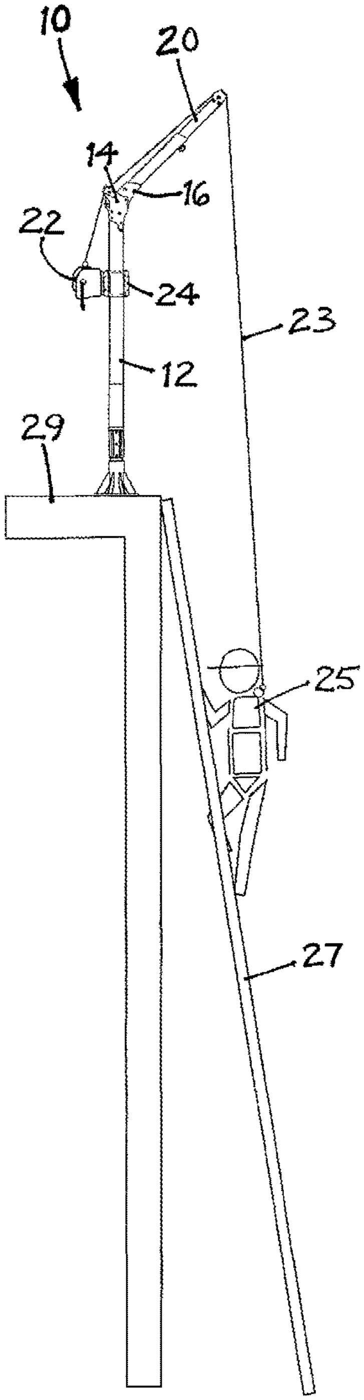
FIGS. 20 to 22 are similar successive schematic drawings to those of FIGS. 17 to 19, but showing a person falling from a ladder and being arrested in their fall, with excessive arresting forces not being absorbed by the primary fall arrestor system of the davit, but ultimately being absorbed by the fuse head and causing the jib arm and fuse head to rotate downwardly relative to the fuse holder and mast of the davit.
Figure 21:
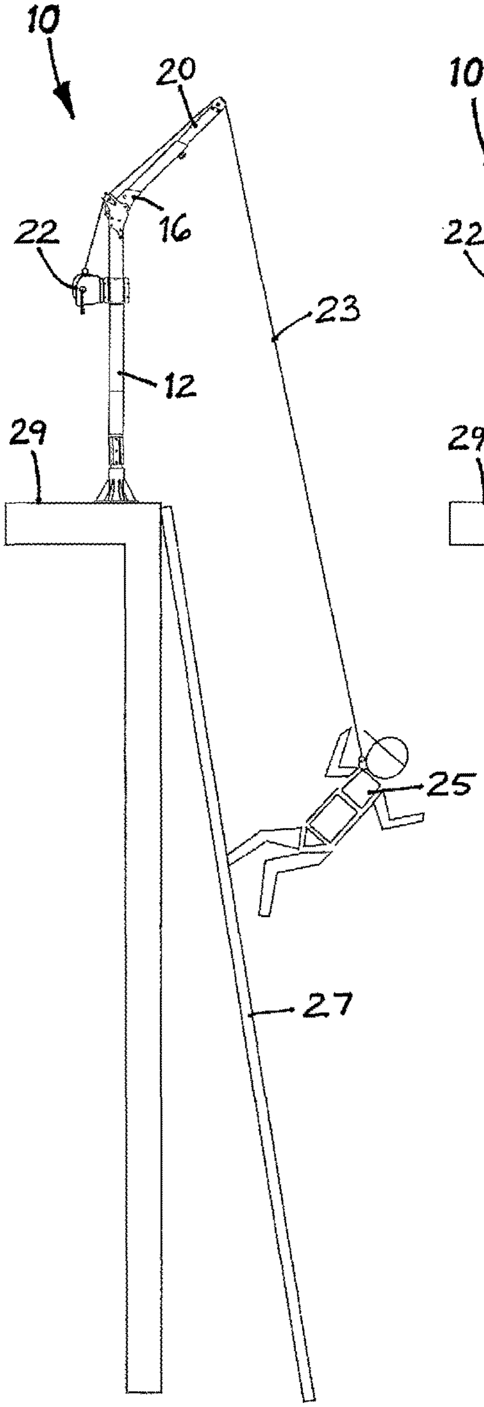

However, when an arresting load limit of the self-retracting lifeline 22 of the davit 10, 100 is exceeded during the fall of a person 25 from the ladder 27 (as shown in FIGS. 20 to 22), such as when the self-retracting lifeline 22 fails or malfunctions, the arrangement of the first and second connections 26, 28 is such that the fuse head 16 will rotate downwardly relative to the fuse holder 14, causing the connected jib arm 20 to rotate downwardly with it (as shown in FIG. 22).

Figure 10:
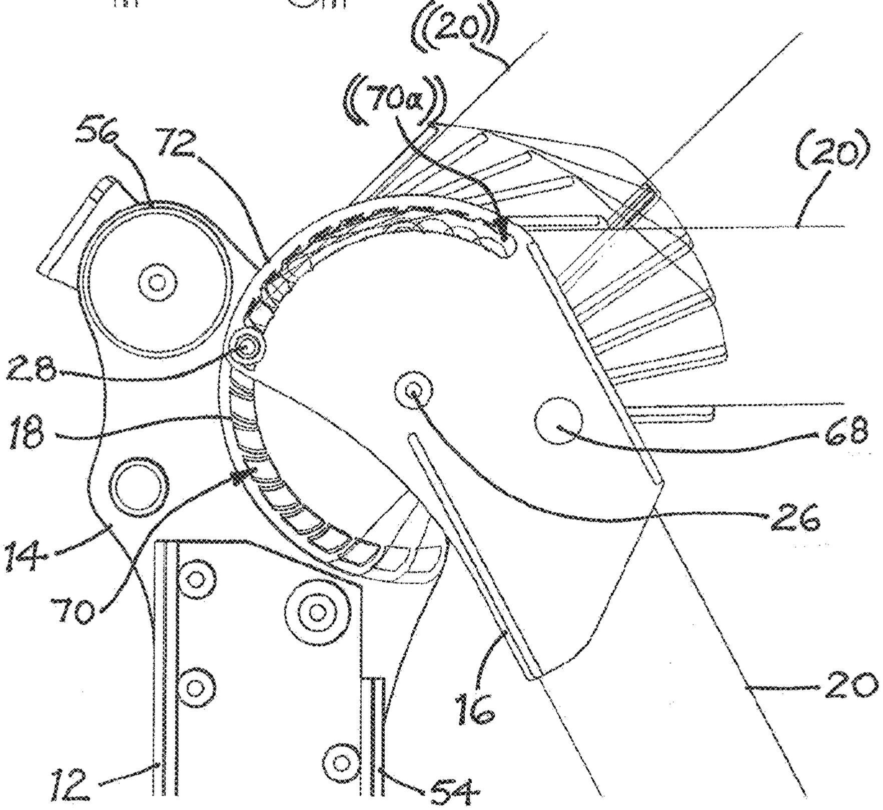
FIG. 10 is a side view of the arrangement shown in FIG. 9, but showing the position of the jib arm and fuse head after they have rotated downwardly relative to the fuse holder in response to an excessive force either when the davit is used for arresting the fall of a person working at heights or when the davit is used for material handling where lifting of overloaded material is prevented.
Figure 11:
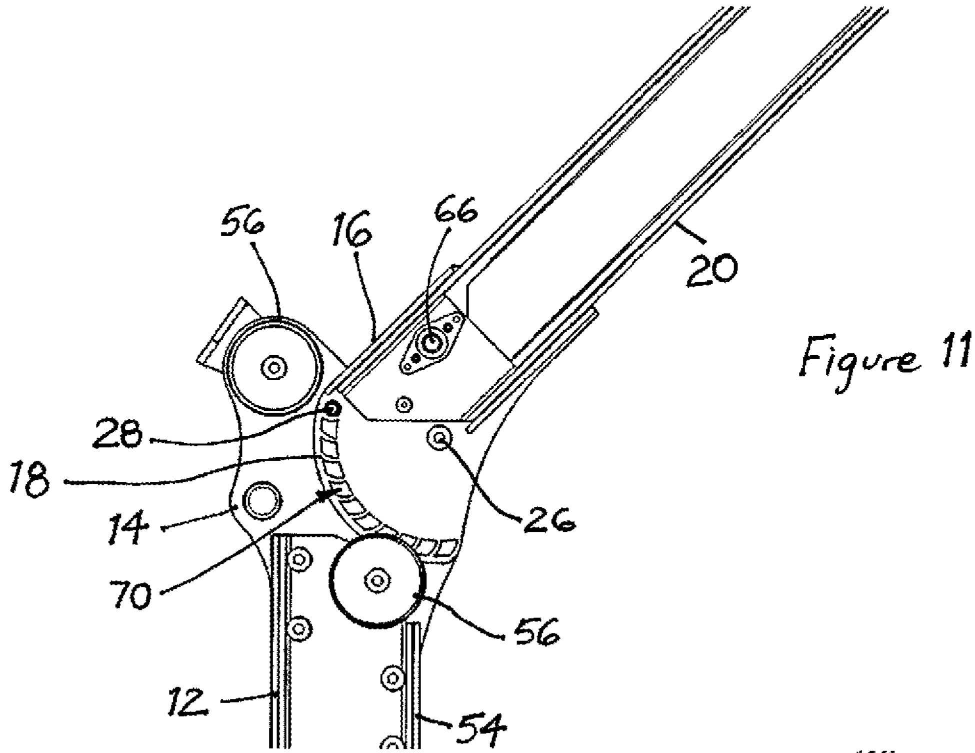
FIG. 11 is a side view of the arrangement shown in FIG. 8 showing a starting position of the jib arm and fuse head when there is no excessive force above a load limit of the primary fall arrestor system or the primary lifting-overload prevention system of the davit being experienced.
Figure 12:
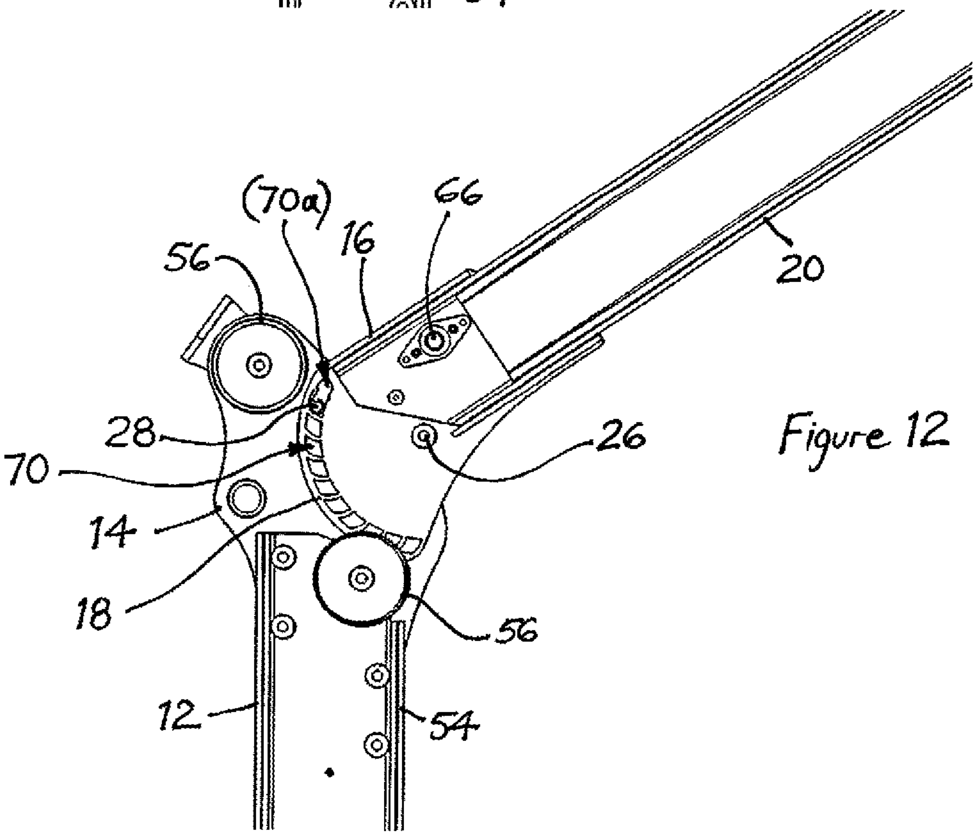
FIG. 12 is a similar view to that of FIG. 11, but showing that the jib arm and fuse head have rotated downwardly after an excessive force has been experienced and caused a first one of the sacrificial fuses of the fuse head to break.
Figure 13:
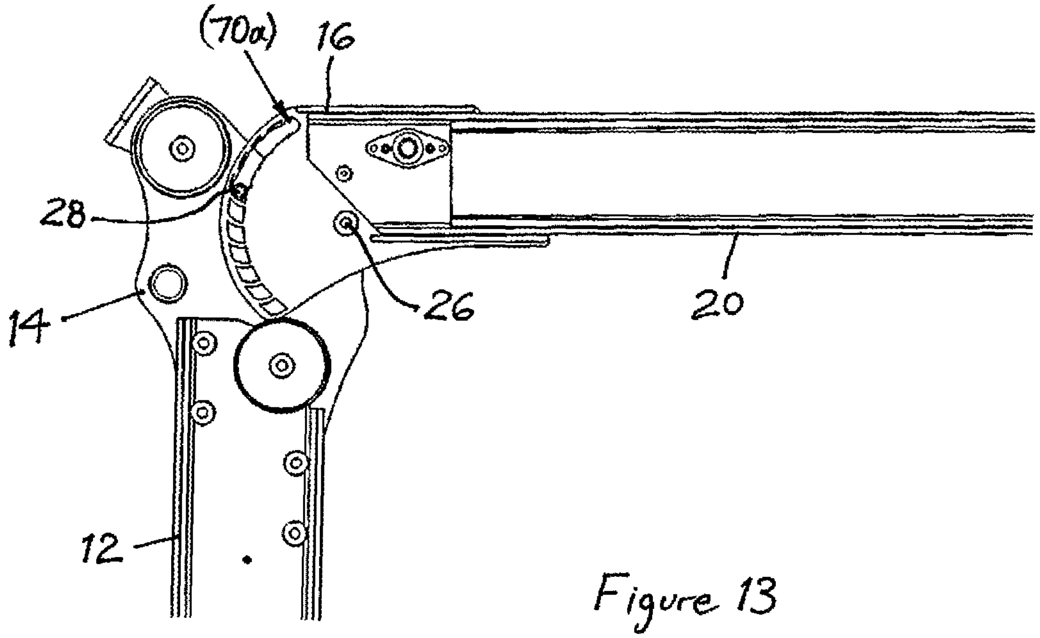
FIG. 13 is a similar view to that of FIG. 12, but showing that the jib arm and fuse head have rotated further downwardly due to the excessive force continuing to be experienced and causing more of the sacrificial fuses of the fuse head to break.
Figure 14:
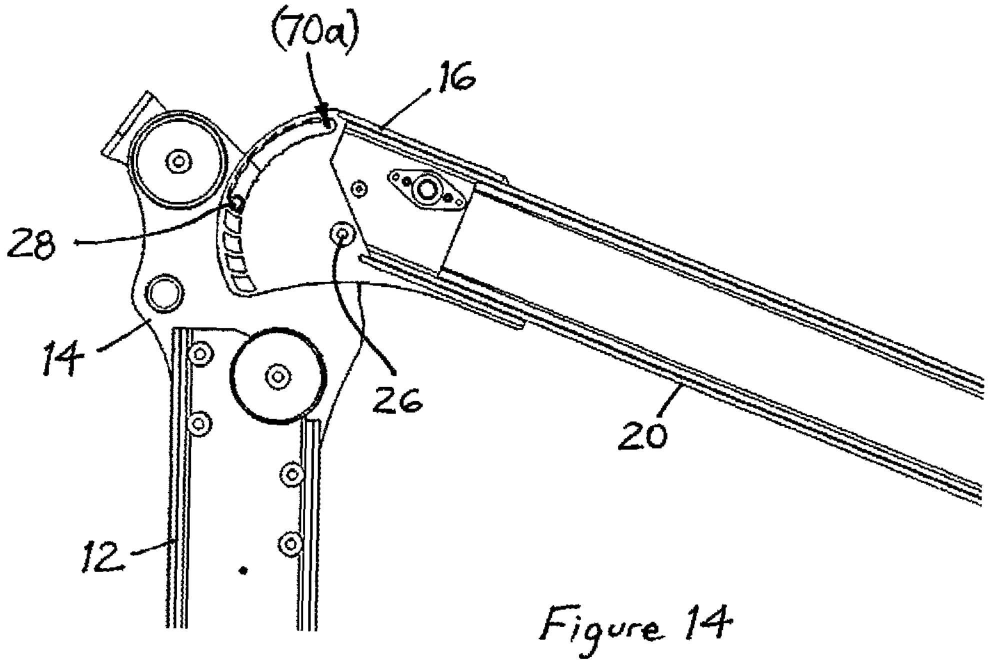
FIG. 14 is a similar view to that of FIG. 13, but showing that the jib arm and fuse head have rotated even further downwardly due to the excessive force continuing to be experienced and causing even more of the sacrificial fuses of the fuse head to break.
Figure 15:
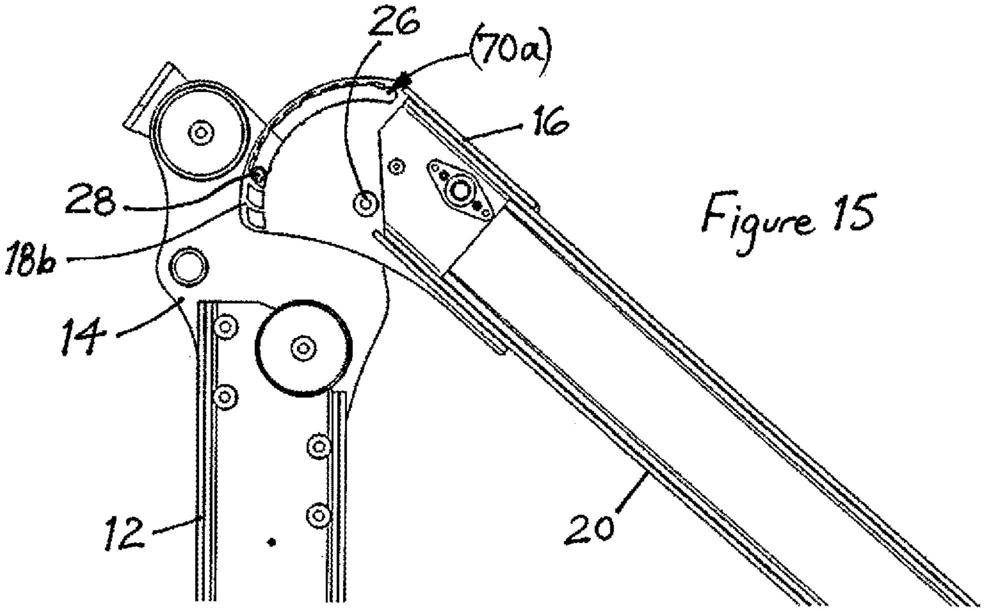
FIG. 15 is a similar view to that of FIG. 14, but showing that the jib arm and fuse head have rotated still further downwardly due to the excessive force continuing to be experienced and causing still more of the sacrificial fuses of the fuse head to break.
Figure 16:
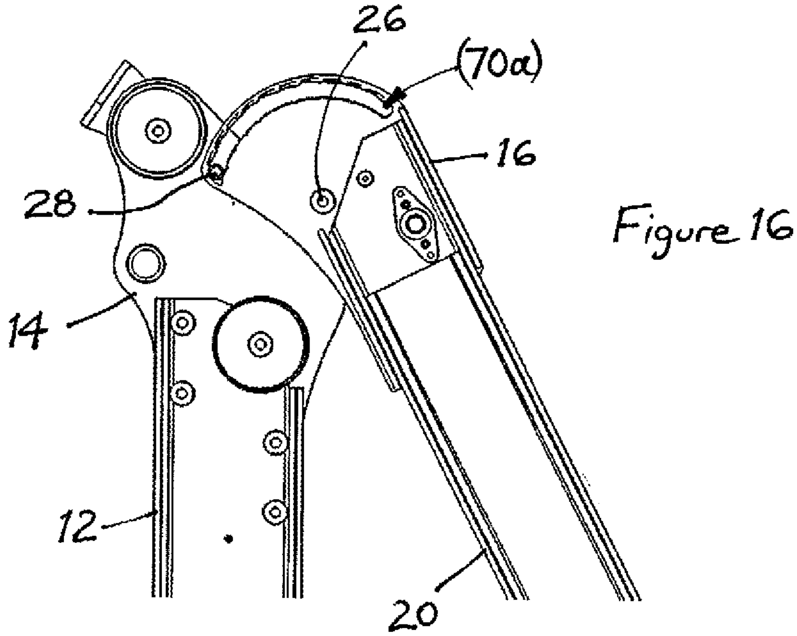
FIG. 16 is a similar view to that of FIG. 15, but showing that the jib arm and fuse head have rotated even further downwardly due to the excessive force continuing to be experienced until the full extent of rotation has been reached and causing a last one of the sacrificial fuses of the fuse head to break.

The rotation of the fuse head 16 is around the first connection 26 to the fuse holder 14 (as best shown in FIG. 10), and that rotation is the result of the excessive arresting forces causing the second connection 28 to the fuse holder 14 to break one or more of the sacrificial fuses 18 of the fuse head 16 until enough fuses 18 have been broken to absorb the excessive arresting forces experienced by the person 25 during the fall. By this fail-safe mechanism, the person 25 will avoid injury caused by any sudden jolt or shock from an abrupt stop to the fall, and damage to the davit 10 (with the exception, of course, of the fuse head 16) is prevented.

Figure 27:
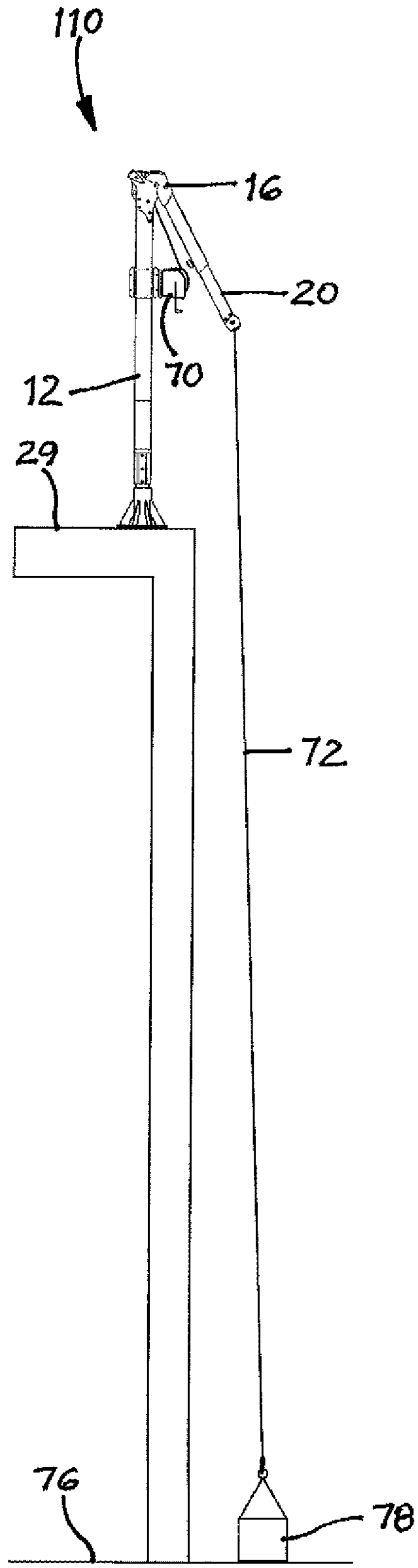

When the davit 10, 100, 110 is used for material handling where lifting of overloaded material 78 is to be prevented (see FIGS. 26 and 27), and a working load limit and safety factors of a primary lifting-overload prevention system of the davit is exceeded by overloaded material 78 to be lifted, such as when the primary lifting-overload prevention system fails or malfunctions, the aforementioned arrangement of the first and second connections 26, 28 causes the fuse head 16 and connected jib arm 20 to rotate downwardly (as shown in FIG. 27). That rotation is the result of excessive overloading forces causing the fuse head's second connection 28 to the fuse holder 14 to break one or more of the sacrificial fuses 18 of the fuse head 16 until enough fuses 18 have been broken to absorb the excessive overloading forces experienced by the davit 10, 100, 110 and which are exerted by the overloaded material 78.

By absorbing any excessive overloading forces beyond the capacity of similar known systems, this "excessive force absorption" function of the davit 10, 100, 110 is able to prevent any serious damage to the structural integrity of the davit which may occur if it were allowed to lift overloaded material which exceeds its capacity.

The davit 10, 100, 110 can therefore provide a secondary "fail-safe" mechanism and improved height safety capability in addition to its primary function as a material handling system. This fail-safe mechanism thereby prevents overloading of, and possible damage to, the davit 10, 100, 110.

According to more preferred embodiments of the davit 10, 100, 110, the load bearing surface to which a lower end of the mast 12 is secured is an elevated concrete slab 29, as shown in FIGS. 17 to 22 and in FIGS. 24 to 27, although any other type of load bearing work platform may be used. In this embodiment, there is a base 30 (or any suitable anchor device) at the lower end of the mast 12 (see especially FIGS. 1 and 2). The base 30 is fixed, either temporarily or permanently, to the slab 29, via fixing holes formed in a lower buttressed flange portion 32 which may receive bolts or other fasteners therethrough. The base 30 has an upper hollow cylinder portion 34 which is configured to receive therewithin a lower cylinder portion 36 (or pin connector) of a mast bottom section 38.

The mast bottom section 38 has a female hollow sub-section 40 and an upper male sub-section 42, a bottom part of which is inserted within the sub-section 40 and is secured thereto at a desired height by passing fastening members through the holes 44. The top part of the upper male sub-section 42 is inserted, in this embodiment, within a female hollow sub-section 46 of a mast extension section 48.

The mast extension section 48 has an upper male sub-section 50, a bottom part of which is inserted within the sub-section 46 to enable the mast 12 to have sufficient height for use of the davit 10 in confined spaces, such as when there is an adjacent guard rail over which an object (such as a stretcher) hoisted by the davit 10 must pass.

A top part of the upper male sub-section 50 is inserted within a female hollow sub-section 52 of a mast top section 54. Secured to the sub-section 52 of the mast top section 54 is the double sided bracket 24.

Figure 5:
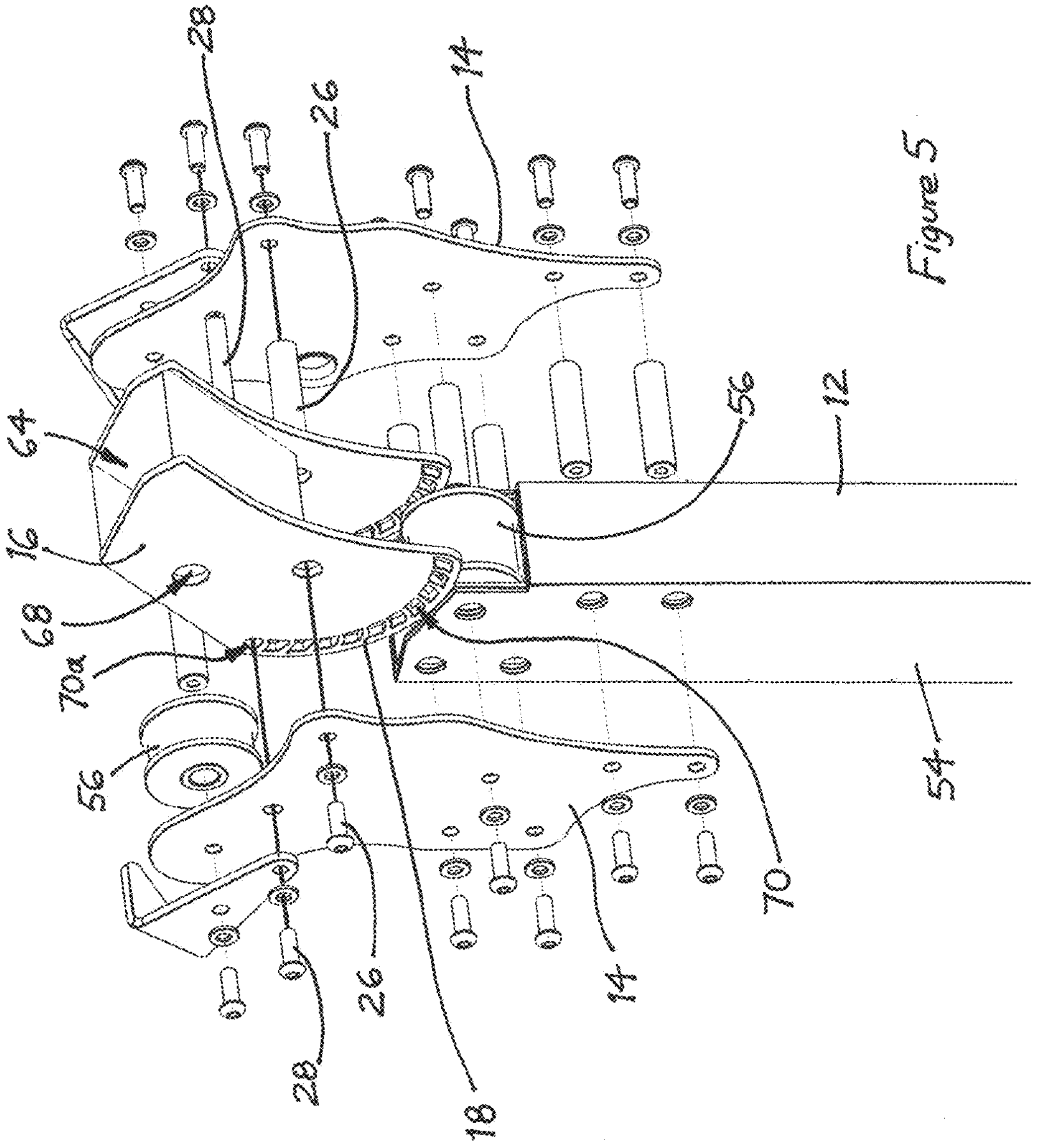
FIG. 5 is an exploded perspective view of the fuse holder and mast of FIG. 3 and the fuse head of FIG. 4.

It is to the upper end of the mast top section 54 of the mast 12 that the fuse holder 14 is secured by multiple connections, and two of those connections 26, 28 also allow the fuse head 16 to be connected to the fuse holder 14. A preferred arrangement by which the fuse holder 14 and fuse head 16 are so secured is shown in FIG. 5. A plurality of bolts, washers, tubular sleeves and spacers cooperate through suitably located and sized holes in the fuse holder 14, fuse head 16 and mast top section 54 (as well as in associated roller guide wheels 56) to interconnect all of the components shown in FIG. 5.

As best shown in FIG. 2, the jib arm 20 has a proximal portion 58 nearest the mast 12, and has a distal portion 60 which is slidably movable within the proximal portion 58 to adjust the length of the jib arm 20, whereupon the jib arm 20 is locked in position by a two-step "turn and pull" spring loaded lock 62.

The jib arm 20 is connected to the fuse head 16 by insertion of the proximal portion 58 within an upper opening 64 of the fuse head 16. An opposed pair of internally mounted spring pins 66 on the proximal portion 58 of the jib arm 20 engage outwardly with correspondingly positioned apertures 68 on the fuse head 16.

In the operation of the davit 10, 100 which enables it to absorb any excessive arresting forces experienced by a person 25 during a fall, it is the first and second connections 26, 28 which are primarily responsible for the downward rotation of the fuse head 16 and jib arm 20, and for the dissipation of energy (or absorption of excessive arresting forces above 4 kN) generated during a fall which exceed an arresting load limit.

The condition of the sacrificial fuses 18 of the fuse head 16 will also provide an immediate and clear indication to an operator that a major fall or material overload has occurred, especially in material handling applications where such overloading may not always be witnessed or reported immediately, so that removal of the davit from service and subsequent inspection and repair may take place.

As best shown in FIGS. 4 and 8 to 10, the sacrificial fuses 18 are a series of thin plate regions (or mechanical fuses) of the fuse head 16, arranged in an alternating order with a complementary series of holes 70 and located adjacent the circumferential edge of a circular crescent region 72 of the fuse head 16. The second connection 28 is through a starter hole 70*a* in the series of holes 70 in the fuse head 16, and the starter hole 70*a* has an edge region which forms a first edge of a first sacrificial fuse 18*a* in the series of thin plate regions which form the fuses 18 which end with the last sacrificial fuse 18*b*.

In the event of excessive arresting forces being absorbed by the self-retracting lifeline 22 of davit 10 by the fall of a person 25 working at heights, or when, during material handling, a weight load limit and safety factors of the davit are exceeded to create a material overload (also called a system overload), the sacrificial fuses 18 in the fuse head 16 will, as shown in FIGS. 11 to 16, begin to break (or snap) one at a time, starting with the first sacrificial fuse 18*a* (see FIG. 12), causing the jib arm 20 to be lowered by increments corresponding to the number of fuses 18 which are broken. This action will continue until the excessive arresting forces are absorbed (or dissipated), or until (in very rare instances when operator error or system misuse is usually to blame) the second connection 28 breaks the last sacrificial fuse 18*b* in the series of fuses 18 (see FIG. 16). Ideally, the jib arm 20 should never reach the final position shown in FIG. 16 under the range of arresting forces which may foreseeably be generated under normal working conditions and when the davit 10, 100 is used with a faulty or malfunctioning self-retracting lifeline.

The latter part of the rotation of the fuse head 16 and the connected jib arm 20, which reduces the horizontal reach of the jib arm 20 (see from FIGS. 13 to 16), has the advantage of safely dampening the high torsional forces and torque applied to the mast 12 under such excessive forces, allowing the mast 12 to survive very heavy loads.

As will be readily apparent from the above, this "excessive force absorption" function of the davit 10, 100, 110 is a secondary "fail-safe" mechanism and improved height safety capability that is only activated should a primary fall arrestor system of the davit be exceeded or malfunction when the davit is used for arresting the fall of a person working at heights, or should a primary lifting-overload prevention system of the davit be exceeded or malfunction when the davit is used for material handling where lifting of overloaded material is to be prevented, or there is an error or system misuse by the operator.

The davit 10, 100, 110 therefore has the advantage that it is able to arrest the fall of a person without causing injury from any sudden jolt or shock caused by an abrupt stop in the fall, and is able to prevent any serious damage to the structural integrity of the davit which may occur if it were allowed to lift overloaded material which exceeds its capacity.

Also significantly, the fuse head provides a readily accessible visual indication that a major fall or a material overload has occurred, prompting the operator (or inspector) to remove the davit 10, 100, 110 from service for inspection and repairs. If such an event were to occur, the fuse head 16 can be replaced and, provided no further damage has occurred to the davit, the davit can be quickly returned to service.

It will be readily appreciated by persons skilled in this art, upon reading this description of embodiments of the invention, that there may be alternative embodiments of the davit which fall within the scope of this invention.

It will also be readily apparent to persons skilled in the art that various modifications may be made in details of the design and construction of the above embodiments of the davit without departing from the scope or ambit of the present invention.

The reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavour to which this specification relates before the filing date of this patent application.

The invention claimed is:

1. A davit for arresting the fall of a person working at heights or for material handling where lifting of overloaded material is prevented; and for absorbing excessive forces experienced either by the person when they are being arrested in their fall after falling from a height, or by the davit and which are exerted by the material to be lifted from a supporting surface, the davit comprising:

(a) a mast secured at a lower end to a load bearing surface, (b) a fuse holder secured to an upper end of the mast, (c) a fuse head connected to the fuse holder by spaced apart first and second connections, the fuse head comprising a plurality of sacrificial fuses arranged in series thereon, (d) a jib arm connected to the fuse head, and (e) a primary fall arrestor system having an arresting load limit and mounted to a side of the mast if the davit is to be used for arresting the fall of a person working at heights, and/or a primary lifting-overload prevention system having a working load limit and safety factors if the davit is to be used for material handling where lifting of overloaded material is to be prevented, and wherein, when non-excessive forces are being absorbed either by the primary fall arrestor system or by the primary lifting-overload prevention system, the fuse head will remain stationary relative to the fuse holder, and wherein, when excessive forces are being absorbed either by the primary fall arrestor system or by the primary lifting-overload prevention system, the fuse head will rotate downwardly relative to the fuse holder, and wherein the rotation of the fuse head is around the first connection to the fuse holder and is the result of the excessive forces causing the second connection to the fuse holder to break one or progressively more of the sacrificial fuses of the fuse head until enough fuses have been broken to absorb the excessive forces experienced by the person when they are arrested in their fall or by the davit and which are exerted by the overloaded material to be lifted.

2. The davit of claim 1, wherein the second connection is through a starter hole in the fuse head.

3. The davit of claim 2, wherein the starter hole has an edge region which forms a first edge of a first sacrificial fuse in the series of sacrificial fuses.

4. The davit of claim 3, wherein the sacrificial fuses are a series of thin plate regions of the fuse head.

5. The davit of claim 4, wherein the thin plate regions of the fuse head are arranged in an alternating order with a complementary series of holes, beginning with the starter hole.

6. The davit of claim 5, wherein the thin plate regions of the fuse head are located adjacent a circumferential edge of a circular crescent region of the fuse head.

7. The davit of claim 1, wherein the primary fall arrestor system is a self-retracting lifeline.

8. The davit of claim 1, wherein the davit comprises both a self-retracting lifeline and a material handling winch.

9. The davit of claim 8, wherein the material handling winch is mounted on an opposite side of the mast to where the self-retracting lifeline is mounted.

10. The davit of claim 9, wherein a double sided bracket is secured to the mast, and the self-retracting lifeline is mounted to a first side of a double sided bracket, and the material handling winch is mounted to a second side of the double sided bracket.

11. The davit of claim 1, wherein the jib arm has a proximal portion nearest the mast, and has a distal portion which is slidably movable within the proximal portion to adjust the length of the jib arm, whereupon the jib arm is locked in position by a two-step turn and pull spring loaded lock.

12. The davit of claim 11, wherein the jib arm is connected to the fuse head by insertion of the proximal portion within an upper opening of the fuse head.

13. The davit of claim 12, wherein an opposed pair of internally mounted spring pins on the proximal portion of the jib arm engage outwardly with correspondingly positioned apertures on the fuse head.

14. The davit of claim 1, wherein, when the sacrificial fuses in the fuse head are absorbing excessive forces and begin to break one at a time, the jib arm is lowered or rotates downwardly by increments corresponding to the number of fuses which are broken.

15. The davit of claim 1, wherein the arrangement of the first and second connections is such that the fuse head will remain stationary relative to the fuse holder when the primary fall arrestor system is in operation to arrest the fall of a person who experiences non-excessive arresting forces during the fall, and such a fall does not cause the fuse head and jib arm to rotate downwardly relative to the fuse holder.

16. The davit of claim 1, wherein the arrangement of the first and second connections is such that the fuse head will remain stationary relative to the fuse holder when the primary lifting-overload prevention system is in operation to arrest the fall of a person who experiences non-excessive arresting forces during the fall, and such a fall does not cause the fuse head and jib arm to rotate downwardly relative to the fuse holder.

* * * * *